United States Patent
Miyakawa et al.

(10) Patent No.: US 7,199,187 B2
(45) Date of Patent: Apr. 3, 2007

(54) SHEET

(75) Inventors: Takeshi Miyakawa, Gunma (JP); Minoru Oda, Gunma (JP); Masafumi Hiura, Gunma (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 292 days.

(21) Appl. No.: 10/494,375

(22) PCT Filed: Nov. 15, 2002

(86) PCT No.: PCT/JP02/11946

§ 371 (c)(1), (2), (4) Date: May 13, 2004

(87) PCT Pub. No.: WO03/041957

PCT Pub. Date: May 22, 2003

(65) Prior Publication Data

US 2004/0265610 A1  Dec. 30, 2004

(30) Foreign Application Priority Data

Nov. 16, 2001 (JP) .............................. 2001-351192

(51) Int. Cl.
*B32B 27/30* (2006.01)
(52) U.S. Cl. ............................ 525/71; 525/66; 525/69; 525/86; 524/495; 524/496; 428/43; 428/57; 428/34.6; 428/35.9; 428/297.1; 428/594
(58) Field of Classification Search .................. 525/71, 525/66, 69, 86; 524/495, 496; 428/43, 57, 428/34.6, 35.9, 297.1, 594
See application file for complete search history.

(56) References Cited

U.S. PATENT DOCUMENTS 4,153,645 A   5/1979  Lanza
4,493,922 A * 1/1985  Echte et al. .................. 525/71
5,747,164 A   5/1998  Miyakawa et al.
6,136,441 A * 10/2000 MacGregor et al. ........ 428/412

FOREIGN PATENT DOCUMENTS

| EP | 190884 | 8/1986 |
|---|---|---|
| EP | 0 381 239 A2 | 8/1990 |
| EP | 0 620 236 A1 | 10/1994 |
| JP | 60-156709 | 8/1985 |
| JP | 3-87097 | 4/1991 |
| JP | 8-118494 | 5/1996 |
| JP | 10-236576 | 9/1998 |
| WO | 89/05836 | 6/1989 |
| WO | WO 97/39040 | 10/1997 |

* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

A sheet excellent in mechanical performance such as folding endurance is provided. A sheet having a substrate layer using an impact-resistant styrene type resin containing 2 to 15 wt % of rubber particles having a peak at less than 2 μm and an impact-resistant styrene type resin containing 0.2 to 10 wt % of rubber particles having a peak at 2 μm or more in a distribution of volume-based particle diameters, or a sheet having a substrate layer comprising an impact-resistant styrene type resin (A) containing 10 to 15 wt % of rubber having a volume average particle diameter of from 0.5 μm to 1.5 μm and an impact-resistant styrene type resin (B) containing 5 to 10 wt % of rubber having a volume average particle diameter of from 2.0 μm to 3.0 μm wherein (A) is from 50 to 95 wt % and (B) is from 5 to 50 wt % on the basis of the total amount of both components, and a surface layer formed on at least its one surface, is provided.

13 Claims, 1 Drawing Sheet

SHEET

TECHNICAL FIELD

The present invention relates to a sheet used preferably for a packaging container for electronic parts.

BACKGROUND ART

As packaging forms of electronic parts including ICs, an injection tray, a vacuum-formed tray, a magazine, a carrier tape (an embossed carrier tape), etc. may be mentioned. For the packaging container for electronic parts, a polyvinyl chloride type resin, a polyethylene terephthalate type resin, a styrene type resin, a polycarbonate resin or the like is used depending on its characteristics. Among these, the styrene type resin is often used. A packaging container for electronic parts made of a styrene type resin sheet is prepared by thermoforming the sheet in the form of a container. For example, a carrier tape is formed by slitting a styrene type resin sheet to have a predetermined width, and embossed portions, ribs and so on for receiving ICs etc. are formed in the cut sheet. After the ICs etc. are received on the embossed portions, the opening portion is covered with a cover tape. The carrier tape receiving therein ICs etc. is wound into a form of reel to be stored or transported. The carrier tape is rewound from the reel in order to mount the ICs etc. on a substrate. The cover tape is peeled off and the ICs etc. are taken out to use them. The cover tape is peeled off at a high speed in order to increase efficiency. The carrier tape is required to be tough against the winding to form a reel and the rewinding, and further, is required to withstand an impact when the cover tape is peeled off. In JP-A-10-236576, there is a report of a carrier tape made of a styrene type resin having a folding endurance of more than 500 times. In JP-A-8-118494, there is a report of a carrier tape made of a polyphenylene ether type resin having a folding endurance of more than 1000 times.

DISCLOSURE OF THE INVENTION

The present invention is to provide a sheet having the following features and being excellent in mechanical performance such as folding endurance etc.

(1) A sheet having a substrate layer using an impact-resistant styrene type resin containing 2 to 15 wt % of rubber particles having a peak at less than 2 μm and an impact-resistant styrene type resin containing 0.2 to 10 wt % of rubber particles having a peak at 2 μm or more in a distribution of volume-based particle diameters, and a surface layer formed on at least its one surface.

(2) A sheet having a substrate layer comprising an impact-resistant styrene type resin (A) containing 10 to 15 wt % of rubber having a volume average particle diameter of from 0.5 μm to 1.5 μm and an impact-resistant styrene type resin (B) containing 5 to 10 wt % of rubber having a volume average particle diameter of from 2.0 μm to 3.0 μm wherein (A) is from 50 to 95 wt % and (B) is from 5 to 50 wt % on the basis of the total amount of both components, and a surface layer formed on at least its one surface.

(3) The sheet according to the above-mentioned (1) or (2), wherein the surface layer contains a thermoplastic resin (C) and 5 to 50 parts by weight of carbon black on the basis of 100 parts by weight of the thermoplastic resin (C).

(4) The sheet according to the above-mentioned (3), wherein the thermoplastic resin (C) is at least one selected from the group consisting of a polyphenylene ether type resin, a polystyrene type resin and an ABS type resin.

(5) The sheet according to the above-mentioned (3) or (4), wherein the surface layer contains 1 to 50 parts by weight of an olefin type resin (E) and/or 0.2 to 20 parts by weight of a block copolymer (F) produced from styrene and a conjugated diene, on the basis of 100 parts by weight of the total amount of the thermoplastic resin (C) and the carbon black (D).

(6) The sheet according to any one of the above-mentioned (1) to (5), wherein the surface resistivity of the surface layer is from $10^2$ to $10^{10}$ Ω.

(7) The sheet according to any one of the above-mentioned (1) to (6), wherein the thickness of the surface layer is from 2 to 80% of the entire thickness of the sheet.

(8) A packaging container for electronic parts using the sheet as defined in any one of the above-mentioned (1) to (7).

(9) The packaging container according to the above-mentioned (8), wherein the packaging container for electronic parts is a carrier tape.

(10) A package of an electronic part using the packaging container for electronic parts as defined in the above-mentioned (8) or (9).

BEST MODE FOR CARRYING OUT THE INVENTION

Figure 1:
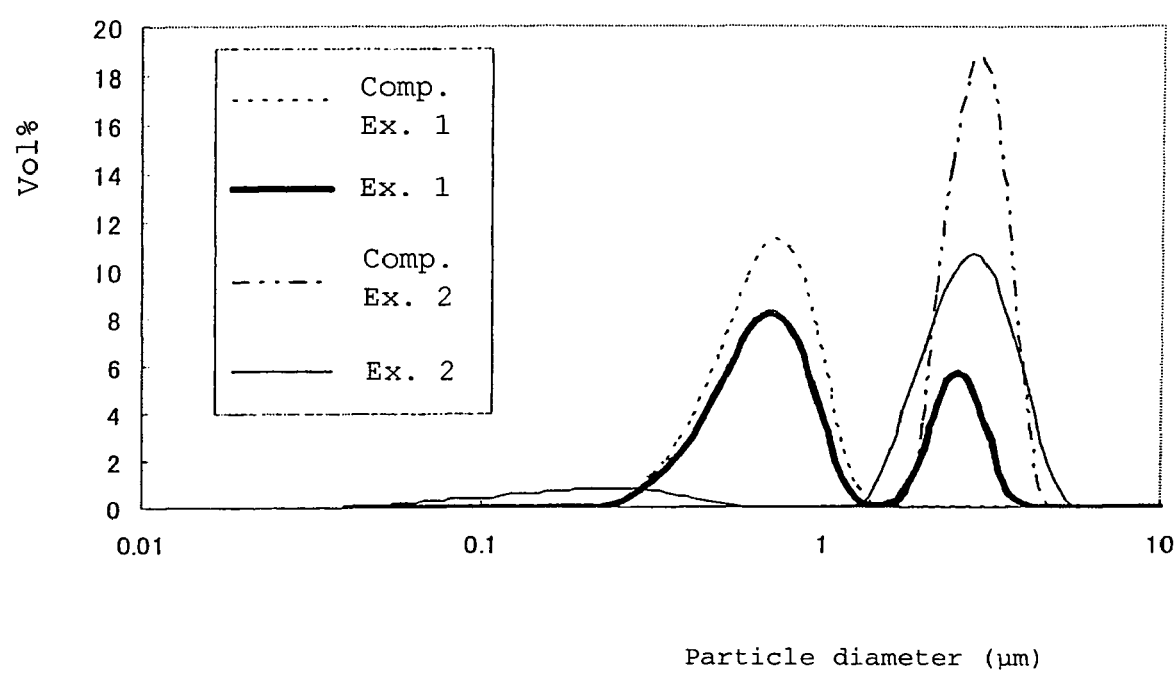
FIG. 1: Distributions of volume-based particle diameters of rubber particles in impact-resistant styrene type resins used in Examples and Comparative Examples

In the following, the present invention will be described in detail.

The sheet of the present invention has a substrate layer and a surface layer. The structure comprising surface layer/substrate layer or surface layer/substrate layer/surface layer is a preferred structure. Another layer may be provided between the surface layer and the substrate layer. As the other layer, an interlayer to improve an adhesion property between the surface layer and the substrate layer may be mentioned, for example.

The impact-resistant styrene type resins used for the substrate layer contain rubber particles having a peak at less than 2 μm and a peak at 2 μm or more in a distribution of volume-based particle diameters. The impact-resistant styrene type resins contain rubber particles having a different distribution of particle diameters. It is preferable that the former impact-resistant styrene type resin contains 2 to 15 wt % of rubber particles having a particle diameter of less than 2 μm and the later import-resistant styrene type resin contains 2 to 10 wt % of rubber particles having a particle diameter of 2 μm or more.

As the impact-resistant styrene type resins, an impact-resistant styrene type resin (A) containing 10 to 15 wt % of rubber having a volume average particle diameter of from 0.5 μm to 1.5 μm and an impact-resistant styrene type resin (B) containing 5 to 10 wt % of rubber having a volume average particle diameter of from 2.0 μm to 3.0 μm wherein (A) is from 50 to 95 wt %, preferably, from 70 to 90 wt % and (B) is from 5 to 50 wt %, preferably, from 10 to 30 wt % on the basis of the total amount of both components, may be mentioned.

When the particle diameters of the rubber particles are within the above-mentioned ranges, good mechanical performance can be obtained. If the amount of the rubber having a smaller particle diameter is smaller, mechanical strengths such as an yield strength, a tensile breaking strength, a tearing strength etc. tend to decrease, and on the other hand, if it is larger, the folding endurance tends to decrease. The impact-resistant styrene type resin may be a commercially available one. As the continuing styrene type copolymer in the impact-resistant styrene type resin, a homopolymer of e.g. polystyrene, poly-α-methylstyrene, polyvinylketone or poly-t-butylstyrene, or the copolymer, or a polymer with acrylonitrile or methyl methacrylate, may be used.

The distribution of volume-based particle diameters can be measured by using a laser diffraction type particle distribution measuring device (such as a laser diffraction type particle analyzer LS-230 manufactured by Beckman Coulter, Inc.).

The volume average particle diameter of the rubber can be obtained by measuring particle diameters (=(longer diameter+shorter diameter)/2) of at least 1000 rubber particles in a picture taken by a transmission type electron microscope for observing ultra-thin resin segments colored by an osmic acid and using the following formula:

Volume average particle diameter=$\Sigma ni \cdot Di^4 / \Sigma ni \cdot Di^3$ (ni represents the number of rubber particles having a particle diameter of $Di$.)

It is possible to incorporate other thermoplastic resins to the substrate layer, if the amount is small, within a range not to deteriorate the mechanical properties. It is possible to incorporate various additives such as a lubricant, a plasticizer, a processing aid and a reinforcing agent (a modifier for resin) in order to improve flowability of the composition and the dynamic characteristics of the molded product, as the case requires.

As the thermoplastic resin (C) used for the surface layer, a polyphenylene ether type resin, a polystyrene type resin, an ABS type resin, a polyester type resin such as a polyethylene terephthalate resin or a polybutylene terephthalate resin, a polycarbonate resin, an olefin type resin (E) or a block copolymer (F) produced from styrene and a conjugated diene, may be used. The thermoplastic rein (C) may be of a single type or of a combination of two or more types.

In a case where a polystyrene type resin is used as the thermoplastic resin (C), it is preferred further to add an olefin type resin (E) and/or a block copolymer (F) produced from styrene and a conjugated diene.

The olefin type resin (E) is a homopolymer of ethylene or propylene, a copolymer containing ethylene or propylene as the main component, or a blend thereof. For example, a polyethylene, a polypropylene, an ethylene/ethyl acrylate copolymer, an ethylene/vinyl acetate copolymer, or an ethylene/α-olefin copolymer resin may be mentioned.

Among these, a polyethylene type resin such as a low-density polyethylene resin, a high-density polyethylene resin or a linear low-density polyethylene resin is preferred. The olefin type resin (E) is preferably one having a melt flow index of 0.1 g/10 min or more at 190° C. under a load of 2.16 kg (measured in accordance with JIS-K-7210). If the melt flow index is low, kneading with a polyphenylene ether type resin, a polystyrene type resin, or an ABS type resin becomes difficult, whereby a good composition is hardly obtainable.

The amount of the olefin type resin added is preferably from 1 to 50 parts by weight, more preferably from 1 to 30 parts by weight, further preferably from 3 to 25 parts by weight, on the basis of 100 parts by weight of the total amount of the thermoplastic resin (C) and carbon black (D). If the added amount is small, the carbon black tends to be detached, whereas if the amount is large, it is difficult to uniformly disperse it in the thermoplastic resin (C).

As the conjugated diene for the block copolymer (F) produced from styrene and a conjugated diene, butadiene or isoprene may be suitably used. As the block copolymer (F), a branched chain stellar form block copolymer disclosed in U.S. Pat. No. 3,281,383, or a linear block copolymer having at least three blocks such as (S1)-(Bu)-(S2) (wherein S1 and S2 represent a block formed by styrene, respectively, and Bu represents a block formed by butadiene). The block copolymer may be of one type, but more preferably, it is preferred to employ two or more types of block copolymers different in the proportion of butadiene to styrene.

As an alloy resin containing the olefin type resin (E) and the block copolymer produced from styrene and a conjugated diene, the resin composition disclosed in JP-A-5-311009, may be used. For example, STYROBLEND WS-2776 (tradename, manufactured by BASF) may be mentioned.

The carbon black (D) may be added to the surface layer to impart an electric conductivity. An electrically conductive sheet can preferably be used as a packaging material for electronic parts such as ICs etc. As the carbon black (D), a furnace black, a channel black, an acetylene black etc. may preferably be used. In particular, such one having a large specific surface area and requiring a small addition amount to the resin while providing a high electric conductivity is preferably used. For example, S.C.F. (super conductive furnace), E.C.F. (electric conductive furnace), Ketjen black (tradename, manufacture by LION-AKZO) or an acetylene black may be mentioned. The addition amount of the carbon black in the surface layer varies depending on the kind used. However, it is preferably added so that the surface resistivity in the state of being laminated on the substrate layer is from $10^2$ to $10^{10}$ Ω, preferably, from $10^2$ to $10^8$ Ω. Accordingly, the addition amount of the carbon black (D) is preferably in a range of from 5 to 50 parts by weight, more preferably, from 5 to 40 parts by weight on the basis of 100 parts by weight of the thermoplastic resin (C). If the addition amount is smaller, a sufficient electric conductivity can not be obtained. If it is larger, uniform dispersibility with respect to the resin becomes poor; formability decreases significantly and physical values such as mechanical strength etc. decrease. If the surface resistivity becomes larger, an expected antistatic performance can not be obtained, and if it becomes smaller, the electric generating capacity increases too much whereby there is a danger of causing destruction of electronic parts. To the surface layer, various additives such as a lubricant, a plasticizer, a processing aid and another resin may be added so long as the addition is against the object of the present invention.

The entire thickness of the sheet is preferably from 0.1 to 3.0 mm, more preferably, from 0.1 to 1 mm. If the entire thickness is less than 0.1 mm, the strength of a packaging container obtained by forming the sheet is insufficient. If it exceeds 3.0 mm, formability by e.g. a compressed air forming, a vacuum forming or a hot plate forming becomes difficult. The proportion of the thickness of the surface layer to the entire thickness at its one side is preferably from 2 to 80%, more preferably, from 2 to 30%. If it is less than 2%, it is difficult to obtain the antistatic performance of the packaging container formed by the sheet.

There is in particular no limitation to the process for producing the sheet. For example, the substrate layer and the surface layer may be separately formed into a sheet-like form or a film-like form by using an extruder, followed by laminating them stepwise by a thermo-lamination method, a dry-lamination method, an extrusion-lamination method or the like. Further, a laminated sheet may be formed at a time by a multi-layer co-extruding method using a feed block, a multi-manifold die or the like.

The sheet can preferably be used for a packaging member for electronic parts. A packaging container obtained by a known sheet forming method such as a compressed air forming, a vacuum forming or a hot plate forming can be used as a packaging container for electronic parts. For example, a vacuum tray, a magazine or an embossed carrier tape for packaging electronic parts, and a vacuum-formed tray for packaging an electronic appliance using electronic parts may be mentioned.

In the following, some examples of the present invention will be described in detail.

EXAMPLE 1

As the substrate layer, a dry-blend comprising 90 wt % of an impact-resistant styrene type resin (A) (XL1, manufactured by Toyo Styrene K.K., Volume average particle diameter: 0.7 μm, Rubber content: 13.0 wt %) and 10 wt % of an impact-resistant styrene type resin (B) (H850, manufactured by Toyo Styrene K.K., Volume average particle diameter: 2.8 μm, Rubber content: 10.0 wt %) was used.

As the resin for a surface layer, an electrically conductive compound which was produced by measuring respectively 80 parts by weight of an impact-resistant polystyrene type resin (H1-E4, manufactured by Denki Kagaku Kogyo K.K.), 20 parts by weight of carbon black (DENKA BLACK, manufactured by Denki Kagaku Kogyo K.K.), 10 parts by weight of an EEA resin (DPDJ-6169, manufactured by Nippon Unicar Company Limited) and 20 parts by weight of a polystyrene resin containing a styrene-butadiene block copolymer and an olefin type resin (STYROBLEND WS-2776, manufactured by BASF); blending them uniformly by means of a high speed blending machine; kneading the blend by means of a ϕ45 mm bent type twin screw extruder and palletizing the kneaded product by a strand cut method, was used.

The resins for both layers were co-extruded in accordance with a feed-block method using a ϕ65 mm extruder (L/D=28), a ϕ40 mm extruder (L/D=26) and a T-die having a width of 500 mm to obtain a three-layered sheet having an entire sheet thickness of 300 μm and a surface layer thickness at each side of 30 μm.

EXAMPLE 2

As the substrate layer, a dry-blend comprising 70 wt % of an impact-resistant styrene type resin (A) (XL1, manufactured by Toyo Styrene K.K., Volume average particle diameter: 0.7 μm, Rubber content: 13.0 wt %) and 30 wt % of an impact-resistant styrene type resin (B) (H850, manufactured by Toyo Styrene K.K., Volume average particle diameter: 2.8 μm, Rubber content: 10.0 wt %) was used, and as a resin for the surface layer, such one as used in Example 1 was used. In the same manner as Example 1, the co-extrusion was conducted in accordance with the feed-block method using the ϕ65 mm extruder (L/D=28), the ϕ40 mm extruder (L/D=26) and the T-die having a width of 500 mm to obtain a three-layered sheet having an entire sheet thickness of 300 μm and a surface layer thickness at each side of 30 μm.

COMPARATIVE EXAMPLE 1

As the substrate layer, an impact-resistant styrene type resin (A) (XL1, manufactured by Toyo Styrene K.K., Volume average particle diameter: 0.7 μm, Rubber content: 13.0 wt %) was used, and as a resin for the surface layer, such one as used in Example 1 was used. In the same manner as Example 1, the co-extrusion was conducted in accordance with the feed-block method using the ϕ65 mm extruder (L/D=28), the ϕ40 mm extruder (L/D=26) and the T-die having a width of 500 mm to obtain a three-layered sheet having an entire sheet thickness of 300 μm and a surface layer thickness at each side of 30 μm.

COMPARATIVE EXAMPLE 2

As the substrate layer, an impact-resistant styrene type resin (B) (H850, manufactured by Toyo Styrene K.K., Volume average particle diameter: 2.8 μm, Rubber content: 10.0 wt %) was used, and as a resin for the surface layer, such one as used in Example 1 was used. In the same manner as Example 1, the co-extrusion was conducted in accordance with the feed-block method using the ϕ65 mm extruder (L/D=28), the ϕ40 mm extruder (L/D=26) and the T-die having a width of 500 mm to obtain a three-layered sheet having an entire sheet thickness of 300 μm and a surface layer thickness at each side of 30 μm.

COMPARATIVE EXAMPLE 3

As the substrate layer, a dry-blend comprising 75 wt % of an impact-resistant styrene type resin (B) (H850, manufactured by Toyo Styrene K.K., Volume average particle diameter: 2.8 μm, Rubber content: 10.0 wt %) and 25 wt % of an impact-resistant styrene type resin (HI-E4, manufactured by Toyo Styrene K.K., Volume average particle diameter: 3.1 μm, Rubber content: 6.4 wt %) was used, and as a resin for the surface layer, such one as used in Example 1 was used. In the same manner as Example 1, the co-extrusion was conducted in accordance with the feed-block method using the ϕ65 mm extruder (L/D=28), the ϕ40 mm extruder (L/D=26) and the T-die having a width of 500 mm to obtain a three-layered sheet having an entire sheet thickness of 300 μm and a surface layer thickness at each side of 30 μm.

With respect to the sheets obtained in the above Examples and Comparative Examples, evaluation was conducted as follows.

(Evaluation)

Physical properties were measured under environmental conditions of 23° C. and a humidity of 50%.

(1) Tensile Strength

In accordance with JIS (Japanese Industrial Standard)-K-7127, tensile tests were conducted using test pieces No. 4 at a tensile rate of 10 mm/min with Instron type tensile tester to measure a linear elastic coefficient, an yield strength and an elongation up to the breaking with respect to a longitudinal direction (MD direction) and a width direction (TD direction) of the sheets.

(2) Folding Endurance

In accordance with JIS-P-8116, measurements were conducted with respect to a longitudinal direction and a width direction of the sheets. Numerals are indicated by averaged values.

(3) Impact Strength

Samples were cut out from the sheets produced in Examples and Comparative Examples and were measured with a load of 500 g and a load of 1 kg using a ½-inch semi-spherical impact pin in a Du Pont type impact tester (manufactured by Toyo Seiki K.K.) at an environmental temperature of 23° C. Results are shown in terms of 50% impact destruction energy value (unit: J) according to JIS-K7211.

(4) Surface Resistivity

By using a LORESTA MCP tester (manufactured by Mitsubishi Petrochemical Co., Ltd.) and setting the terminal distance to be 10 mm, surface resistances were measured at 40 locations, i.e., 10 locations at equivalent distances in a width direction in two lines in front and rear surfaces of each sheet. Logarithmic averages of measured values are shown as surface resistivities.

(5) Surface Glossiness

5 Locations in front and rear surfaces of each sheet were measured with a Gloss Checker IG-301 (manufactured by Horiba Seisakusho K.K.). Among each average values, a value at a lower glossiness was determined as the surface glossiness.

(6) Volume-Based Particle Diameter Distribution

Measurements were conducted by using a laser diffraction type particle diameter measuring device (Laser diffraction type particle analyzer LS-230, manufactured by Beckman Coulter, Inc.)

Table 1 shows results of measurement of the sheets in Examples and Comparative Examples.

TABLE 1

|  | Ex. 1 | Ex. 2 | Comp. Ex. 1 | Comp. Ex. 2 | Comp. Ex. 3 |
|---|---|---|---|---|---|
| Tensile strength (MPa) | 1431/1380 | 1366/1341 | 1476/1449 | 1054/1028 | 1261/1239 |
| Yield strength (MPa) | 30/28 | 27/24 | 33/30 | 16/15 | 21/19 |
| Elongation (%) | 138/44 | 137/101 | 87/4 | 144/114 | 120/96 |
| Folding endurance (times) | 3917/2469 | 5000/3888 | 2020/129 | 5000/4528 | 3864/1869 |
| Impact strength (J) | 0.81 | 0.88 | 0.71 | 0.69 | 0.90 |
| Surface resistivity ($\Omega$) | $2.0 \times 10^4$/ $9.8 \times 10^3$ | $2.2 \times 10^4$/ $1.1 \times 10^4$ | $2.1 \times 10^4$/ $1.0 \times 10^4$ | $2.5 \times 10^4$/ $1.2 \times 10^4$ | $2.3 \times 10^4$/ $1.1 \times 10^4$ |
| Surface glossiness (%) | 9 | 10 | 10 | 7 | 8 |

Note:
"A numerical value/a numerical value" indicates a value measured in each of MD and TD directions.

FIG. 1 shows distributions of volume-based particle diameters in Examples 1 and 2 and Comparative Examples 1 and 2.

As is clear from FIG. 1, the rubber particles of Example 1 are rubber particles having a peak at less than 2 μm and rubber particles having a peak at 2 μm or more, in a distribution of particle diameters. The amount of the rubber particles having a peak at less than 2 μm was 74% and the amount of those having a peak at 2 μm or more was 26%. In Example 1, the impact-resistant styrene type resins are contained in 12.1 wt % of rubber particles. Accordingly, 9.0 wt % of rubber particles having a particle diameter of less than 2 μm and 1.1 wt % of rubber particles having a particle diameter of 2 μm or more are contained.

Also, in Example 2, rubber particles having a peak at less than 2 μm and rubber particles having a peak at 2 μm or more, in a distribution of particle diameters are contained. The amount of the rubber particles having a peak at less than 2 μm was 24% and the amount of those having a peak at 2 μm or more was 76%. Since the impact-resistant styrene type resins in Example 2 contain 12.1 wt % of rubber particles, they contain 2.9 wt % of rubber particles having a particle diameter of less than 2 μm and 9.2 wt % of rubber particles having a particle diameter of 2 μm or more.

INDUSTRIAL APPLICABILITY

The sheet of the present invention is excellent in mechanical strength and folding endurance and can preferably be used for a packaging container for electronic parts.

The invention claimed is:

1. A sheet having a substrate layer comprising an impact-resistant styrene resin containing 2 to 15 wt % of rubber particles having a peak at less than 2 μm and 0.2 to 10 wt % of rubber particles having a peak at 2 μm or more in a distribution of volume-based particle diameters, and a surface layer formed on at least its one surface.

2. A sheet having a substrate layer comprising an impact-resistant styrene resin (A) containing 10 to 15 wt % of rubber having a volume average particle diameter of from 0.5 μm to 1.5 μm and an impact-resistant styrene resin (B) containing 5 to 10 wt % of rubber having a volume average particle diameter of from 2.0 μm to 3.0 μm wherein (A) is from 50 to 95 wt % and (B) is from 5 to 50 wt % on the basis of the total amount of both components, and a surface layer formed on at least its one surface.

3. The sheet according to claim 1, wherein the surface layer comprises a thermoplastic resin (C) and 5 to 50 parts by weight of carbon black on the basis of 100 parts by weight of the thermoplastic resin (C).

4. The sheet according to claim 2, wherein the surface layer comprises a thermoplastic resin (C) and 5 to 50 parts by weight of carbon black on the basis of 100 parts by weight of the thermoplastic resin (C).

5. The sheet according to claim 3, wherein the thermoplastic resin (C) is at least one selected from the group consisting of a polyphenylene ether resin, a polystyrene resin and an ABS resin.

6. The sheet according to claim 4, wherein the thermoplastic resin (C) is at least one selected from the group consisting of a polyphenylene ether resin, a polystyrene resin and an ABS resin.

7. The sheet according to claim 5, wherein the surface layer contains 1 to 50 parts by weight of an olefin resin (E) and/or 0.2 to 20 parts by weight of a block copolymer (F) produced from styrene and a conjugated diene, on the basis of 100 parts by weight of the total amount of the thermoplastic resin (C) and the carbon black (D).

8. The sheet according to claim 6, wherein the surface layer contains 1 to 50 parts by weight of an olefin resin (E) and/or 0.2 to 20 parts by weight of a block copolymer (F) produced from styrene and a conjugated diene, on the basis of 100 parts by weight of the total amount of the thermoplastic resin (C) and the carbon black (D).

9. The sheet according to any one of claims 1-3 and 4-8, wherein the surface resistivity of the surface layer is from $10^2$ to $10^{10}$ Ω.

10. The sheet according to any one of claims 1-3 and 3-8, wherein the thickness of the surface layer is from 2 to 80% of the entire thickness of the sheet.

11. A packaging container for electronic parts comprising the sheet as defined in any one of claims 1-3 and 4-8.

12. The packaging container according to claim 11, wherein the packaging container for electronic parts is a carrier tape.

13. A package of an electronic part using the packaging container for electronic parts as defined in claim 11.

* * * * *